United States Patent [19]

Marceau

[11] Patent Number: 5,160,001
[45] Date of Patent: Nov. 3, 1992

[54] COMPUTER CARRYING CASE
[75] Inventor: Stephen M. Marceau, San Antonio, Tex.
[73] Assignee: Incom America, Inc. A Corp. of Texas, San Antonio, Tex.
[21] Appl. No.: 848,702
[22] Filed: Mar. 9, 1992
[51] Int. Cl.⁵ .......................... A45C 3/00; A45C 13/10
[52] U.S. Cl. ..................................... 190/102; 190/111; 190/115; 190/127; 190/902
[58] Field of Search ................. 190/11, 102, 109, 111, 190/115, 119, 127, 900, 902

[56] References Cited
U.S. PATENT DOCUMENTS

| | | | |
|---|---|---|---|
| 756,925 | 4/1904 | Wood | 190/111 |
| 1,329,574 | 2/1920 | Axelman | 190/902 |
| 1,702,905 | 2/1929 | Korchmar | 190/109 |
| 2,334,895 | 11/1943 | Bracken | 190/111 |
| 4,821,853 | 4/1989 | Young | 190/111 |

FOREIGN PATENT DOCUMENTS

| | | | |
|---|---|---|---|
| 508485 | 10/1920 | France | 190/115 |
| 510493 | 8/1939 | United Kingdom | 190/109 |
| 659112 | 10/1951 | United Kingdom | 190/109 |

Primary Examiner—Gary E. Elkins
Attorney, Agent, or Firm—Akin, Gump, Hauer & Feld

[57] ABSTRACT

A soft combination briefcase and carrying case for the purpose of transporting a portable computer easily and in relative safety with its ancillary supplies and including structure for suspending the computer unit in the central zone of the carrying case, spaced from the case bottom and ends to protect the computer against damage.

7 Claims, 3 Drawing Sheets

COMPUTER CARRYING CASE

BACKGROUND OF THE INVENTION

1. Field of the Invention

The field of the present invention is the field of carrying cases and more particularly those combination brief and carrying cases used to transport small, notebook computers.

2. Related Art

Early portable computers used a hard exterior shell or housing for protection of the computer components. This solution for the problem of travel-induced damage generally included a keyboard which could be secured over the computer display section so that only the housings were exposed, thereby affording protection to the relatively delicate keyboard and display areas. This type of integrally constructed computer carrying case was typically designed to closely resemble a regular briefcase and to protect its contents against sharp objects and light shocks but could be inadequate for heavy shocks due to a lack of cushioning.

Another approach to this problem was to place the portable computer in an entirely separate case, designed specifically to support the computer unit in suitable areas and to contain said unit in a complete protective shell. A carrying case of this type may also provide cushioning in its areas of contact with the computer unit, to a degree dependent upon the fact that cushioning requires space and therefore additional cushioning requires an increase in overall case dimensions.

In general, hard cases such as the types described above are intended to reach their design objectives while remaining as small and light as possible. For this reason, they may contain a minimum of space for storing other materials often needed while using the computer; paper, pens, clips, staplers, etc., so that a separate case may be carried for these supplies.

Larger laptop or portable lunch-box computers are becoming less common compared to the smaller, more portable notebook computers now on the market. As these smaller computers have become more common in recent years, an increasing number of users have begun to carry them in their hand luggage along with the aforementioned supplies and/or with ordinary traveling items such as clothing. Such small notebook computers are generally very light, in the order of five to seven pounds, so that their housings also must be relatively thin and light, increasing the risk of computer damage from outside hazards.

For this class of portable computers, to supply the need for added protection a number of soft and hard cases have entered the market designed for use by traveling business people for containing both a portable notebook computer and its collateral required items. These soft carrying cases depend on the exterior surface of the computer unit for protection against other objects within the case and upon the skin and padding of the soft case and possibly other contents of the case to attenuate shocks from outside.

For hard case protective units, the greatest common danger to the computer occurs in falls onto a hard surface and this problem is also present with soft cases if they are not carefully packed with shock absorbing materials placed below the computer unit or if said unit shifts its position to the bottom during handling.

The object of the present invention is to supply a soft case of carrying a wide range of laptop computers in comparative safety along with their collateral required supplies.

Another object of the present invention is to provide a means to prevent contact of a computer unit with the outer surface of a soft carrying case during handling and vibration encountered in travel.

Another object of the present invention is to supply a highly organized and useful arrangement of computer related supplies to the user.

Another object of the present invention is to supply the foregoing factors in an attractive carrying case of moderate cost.

Another object of the present invention is to secure the computer directly and rigidly to the carrying handle to make the computer and case easier to carry.

SUMMARY OF THE INVENTION

The present invention comprises a soft carrying case having two or more full length side-by-side pockets on either side of the central dividing wall and means for securely strapping a small portable notebook computer against the upper inside portion of said central dividing wall and spaced from the case bottom. Surplus space in this pocket and in all other pockets may be used to store such ancillary supplies as may be required for use with said computer. The subject case is closed by flaps attached at the top of said case near the openings of said side-by-side pockets and are held closed by appropriate quick acting fastening means. Said flaps are full length and long enough to cover approximately the upper half of said case affording it an extra layer of protection in said upper half. Additional pockets for containing supplies applicable to computer work are attached to the outer walls of said case on both sides of the full length central pockets. These additional pockets and their contents buffer the computer suspended within the central zone of said case. A full length structural rod forms the backbone of the case, imparting form, and rigidity by directly attaching the computer to this rod by means of locking straps; therefore, computer and case are easier to carry. Fabric forming the top closure flaps and the two straps which hold the computer in place in the case are wrapped around this rod and stitched together along its entire length. The flap is sewn around the rod but the straps are just wrapped over the rod and sewn to the central panel to secure. This stitching also engages the upper edge of the central dividing wall so that it is also directly supported by the structural rod. A carrying handle and a shoulder strap mount to rings also fastened around this rod.

Form, stiffness, and strength are imparted to said case by attaching the top of the central dividing wall, the top flaps, and both carrying handle and shoulder strap around a full length structural rod contained within the upper structure of the case comprising the present invention. Applicant's type case is known generically as a "Chesterfield" bag.

DETAILED DESCRIPTION OF THE PREFERRED EMBODIMENT

Figure 1:
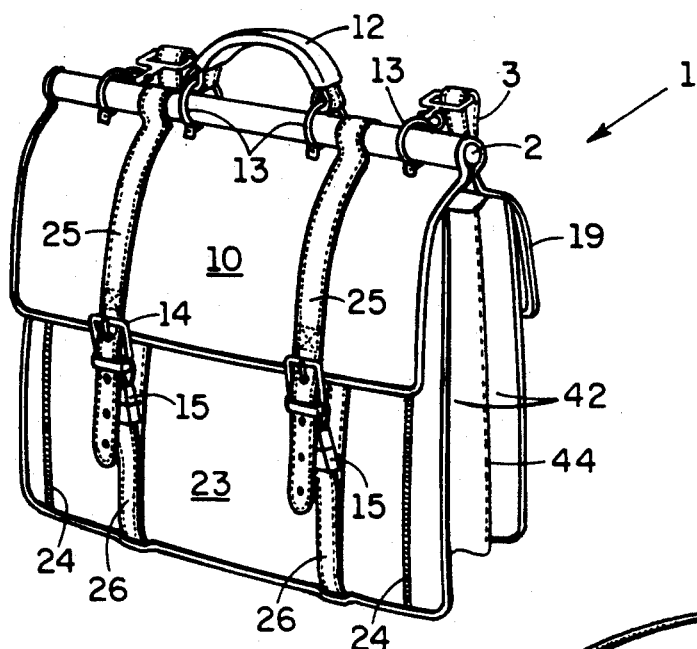
FIG. 1 is a general perspective view of the soft carrying case of the present invention.
Figure 2:
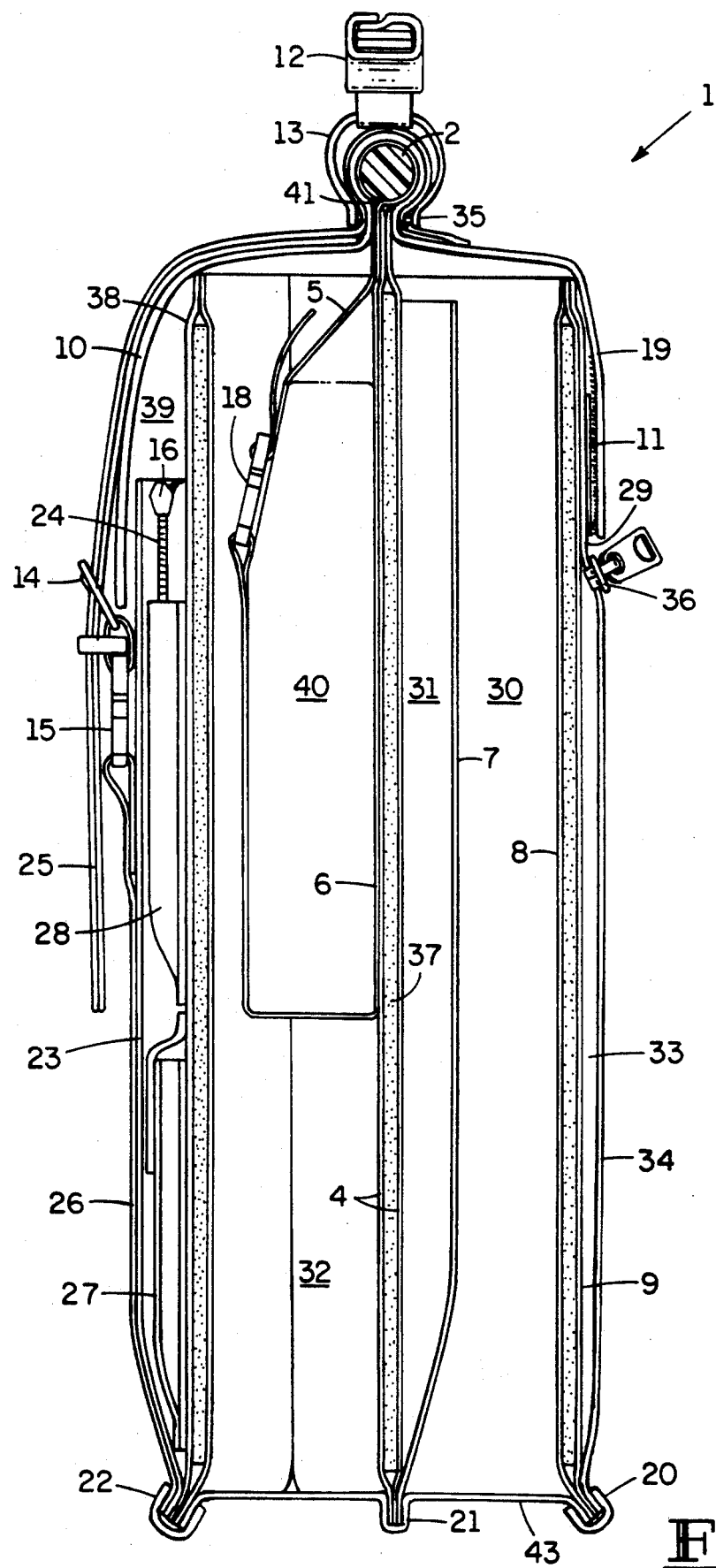
FIG. 2 is a transverse cross sectional view through the center of said case showing arrangement of pockets and construction details.

FIG. 1 is a perspective view of the preferred embodiment of the present invention. This view shows case 1 fitted with both carrying handle 12 and shoulder strap 3 which attach to rings 13 mounted around case stiffening rod 2. Rod 2 extends across the entire width of case 1 and provides a backbone for support of not only handle 12 and strap 3 but also front closure flap 10, rear closure flap 19, upper case closure straps 25, upper computer mounting straps 6 and central dividing wall 4 (FIG. 2).

Figure 3:
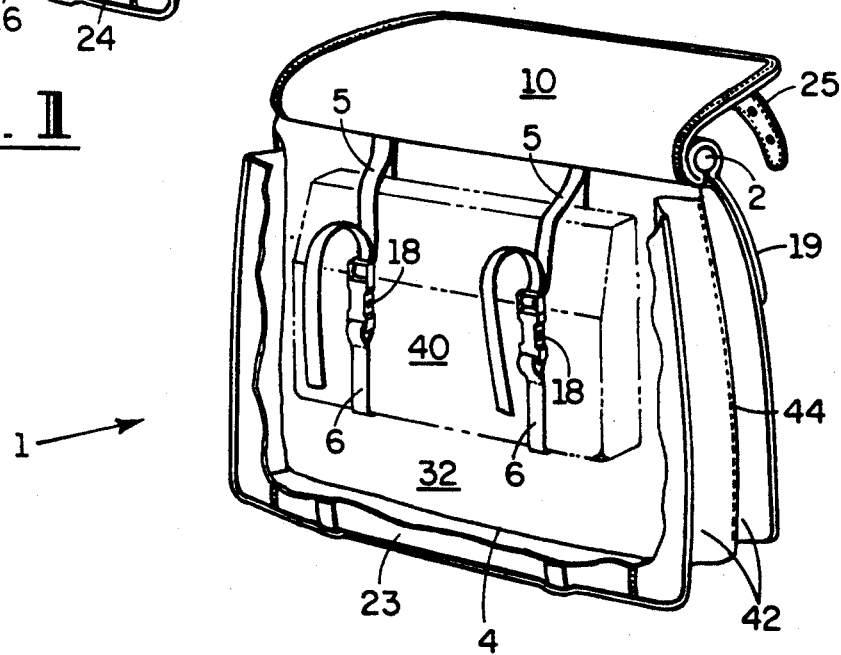
FIG. 3 is a view with the front section of the case cut away to show a computer unit mounted to the central dividing wall.

In this embodiment closure flaps 10 and 19 are formed from a single piece of material wrapped over rod 2 outside the wrap of fabric depending from said rod to form central dividing panel 4 and also over the pair of upper computer mounting straps 5 which pass over rod 2 and descend on the opposite side as lower computer mounting straps 6. Note that strap 5 must pass through slots 41 in panel 4, after which it is redesignated as strap 5, in order that straps 4 and 5 may appear on the same side of wall 4. Straps 5 and 6 are used for enclosing and holding computer 40 when said straps are coupled by means of adjustable fastener 18 (FIG. 3).

The major panels and the seams and stitches by which case 1 is assembled are laterally symmetrical. Hereafter only one end will be described where such symmetry exists.

The fabric panel forming closure flaps 10 and 19, the fabric folded over rod 2 depending to form panel 4, and straps 5 and 25 are all stitched through at 35 in order to enclose rod 2 and to unitize these elements of case 1. Where straps 25 lie above top closure flap 10, said straps are fastened (stitched) to said flap 10 from rod 2 several inches out along straps 25, resulting in additional tensile security for straps 25 and further securing said straps in place near the fasteners 14 to which they attach in closing case 1. Lower case closure straps 26 also are attached from bottom front seam 22 to the outer wall 23 of front pocket 39 for most of the length of said straps 26 for both strength and stabilization, as above. Buckles 14 and quick-connect fasteners 15 are used in tandem between straps 25 and 26. Buckles 14 allow adjustment in the length of the closing strap system while quick-connect fasteners 15 allow the unit to be opened and closed rapidly between adjustments.

Where strap 6 contacts central dividing panel 4, it is firmly attached (stitched) to said panel for holding computer 40 in contact with said panel 4 which is centrally located in case 1. Front pocket 39 is comprised of outer panel 23 disposed over panel 38 which is also the outer panel of primary pocket 32, which holds computer 40 in its mounting straps 5 and 6.

The top of front pocket 39 and primary pocket 32 are both closed by top flap 10, however with top flap 10 open, both sides of front pocket 39 may be opened using handles 16 of zippers 24, allowing front panel 23 with attached straps 26 to fold out from lower front seam 22 and expose the rear wall of pocket 39, which is also the front panel 38 of primary pocket 32.

In FIG. 2, panels 38, 4 and 8 are shown having double wall construction enclosing a sheet of flexible material 37 to add a degree of both structural stiffness and cushioning effect to said walls. This construction is only one of many ways that panels suitable for this service may be constructed, nor is it necessary that they be similar. For example, only wall 4 might be stiffened, or only walls 38 and 4.

Figure 4:
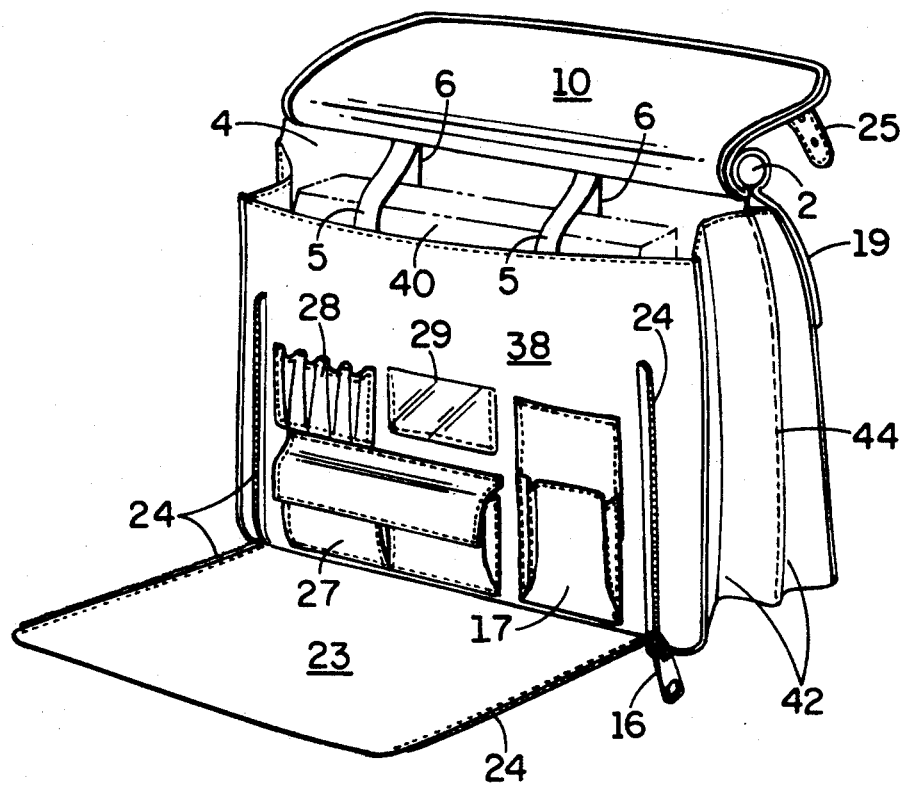
FIG. 4 is a view of the front outer pocket folded back to reveal the multiple specialized pockets within.

FIG. 4 shows case 1 with flap 10 open, both zippers 24 open and front panel 23 folded out as described, exposing wall 38 and the multiplicity of special purpose pockets attached thereto.

In this embodiment, special purpose pockets shown include: 17, for a hand calculator; 27, for a paper stapler; 28, for an assortment of writing implements; and 29, for business cards.

These pockets may hold a variety of other objects, but such items are almost universally required for extended paperwork and it is helpful to have them in a designated location.

Secondary pocket 30 and secondary pocket subdivision 31 lie on the opposite side of central divider panel 4 from computer pocket 32 and front pocket 29. Pocket subdivision 31 is defined by central divider 4 as one wall and panel 7 as its opposite wall. Panel 7 along with central divider 4 are stitched integral with floor panel 43 along bottom seam 21. Ends of pocket subdivision 31 are defined where the sides of panel 7 are stitched to central divider 4 near where it contacts and is stitched to accordionpleated end panel 42 along seam 44 (See FIG. 4).

Secondary pocket 30 is defined by floor panel 43, inner panel 7, outer panel 8 and accordion end panels 44. Pocket 30 is a large, general purpose pocket and may be used for small items of clothing, etc. if the space is not needed for computer supplies.

Outer pocket 33 exists exterior to panel 8 of secondary pocket 30. Case outer skin 34 attaches to floor panel 43 at seam 20 and is stitched to panel 8 at or near its two ends and upper edge, forming this completely enclosed pocket. Seam 29, located across the top of the area designated for pocket 33, lies below the hoop & loop fastener system 11 used for closing upper flap 19 over pockets 30 and 31. A single zipper 36 extending partway across the central top zone of case outer skin 34 provides access to this outer pocket 33.

Referring again to FIG. 2, it can be seen that central dividing panel 4 attaches to the central area of the bottom of case 1 through stitched seam 21 as well as at the top where the fabric skins of panel 4 wrap around rod 2. Panel 4 is thereby stabilized at or near the central zone of case 1 (see also FIG. 3) A computer held in straps and 6 as shown in FIGS. 2 and 3 is held well up from the bottom of said case to give the highest degree of cushioning distance and layers of protection possible in a relatively soft case of this size. It is further seen that the type and placement of ancillary materials (pamphlets, packs of paper, scroll, etc.) will have considerable effect on the degree of shielding afforded to computer 40. In the hands of a concerned owner, this system may equal or exceed the protection afforded by other commercially available notebook computer carrying containers while adding the convenience of having work, supplies and computer all together in a single carrying case.

The present invention fulfills all the objects listed in the discussion of background art. In the preferred embodiment, the principle behind the cushioning effect is developed by several layers of pocket walls and by presumed pocket contents between the centrally suspended computer unit and the exterior sides and ends of the carrying case. The computer unit is also suspended well above the floor of the case in such a way as to require the collapse of not only the lower portion of the central dividing wall to which the computer is mounted but also the other vertical side and endwalls of the case before the computer unit 40 reaches floor panel 43. Contents of primary computer pocket 32, and to a lesser degree, contents of the other full depth pockets, 30 and 31, further resist collapse of the case bottom and provide cushioning material between the computer case and the floor panel 43. Rationale is that the primary damage potential to computer 40 is from falls and that the next highest damage potential is from swinging the case against hard surfaces or from objects swinging against or falling on the case.

The preferred embodiment is but one of a great number of embodiments possible in the spirit of this teaching and the invention is not to be interpreted as limited to the specific means herein illustrated and/or described.

I claim:

1. In a soft carrying case for the transportation of a portable notebook computer unit:
   - a rod extending essentially the full width of said case and integrally contained within the upper surface of said case to which a centrally located full length dividing wall may be attached;
   - a first cover flap depending from the top of said case to cover and essentially close at least one pocket formed within said case on a first side of said dividing wall;
   - a second cover flap depending from the opposite side of the top of said case to cover and essentially close at least one pocket designated for holding a portable notebook computer unit on a second side of said dividing wall;
   - at least one pair of laterally spaced straps vertically extending around the rod and attached to the central dividing wall in said designated pocket from near the top of said pocket to a point partway down said dividing wall and spaced from the case bottom so as to securely contain a portable notebook computer unit against the upper portion of said dividing wall when said straps are fixed around said computer protecting the portable notebook computer unit from damage and making the case and computer easier to carry.

2. The unit according to claim 1 wherein:
   the designated pocket is at least partially covered by an additional pocket placed on its outer wall.

3. The unit according to claim 2 wherein:
   said additional pocket contains a multiplicity of specialized pockets within for receiving various items of collateral computing supplies.

4. The unit according to claim 3 wherein:
   the outside wall of said additional pocket may be released along its sides to fold down and provide clear access to said multiplicity of pockets within.

5. The unit according to claim 1 wherein:
   adjusting buckles are mounted in quick-release clasp systems.

6. The unit according to claim 1 wherein:
   at least one of said cover flaps is secured in the closed position by Velcro fasteners.

7. The unit according to the claim 1 wherein:
   at least one of said cover flaps is secured in the closed position by a buckle and quick-release clamp system.

* * * * *